May 22, 1928.
P. B. REEVES
BELT FASTENER
Filed Aug. 12, 1927
1,671,048
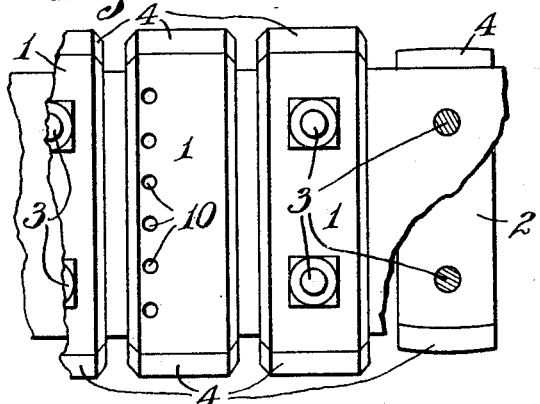
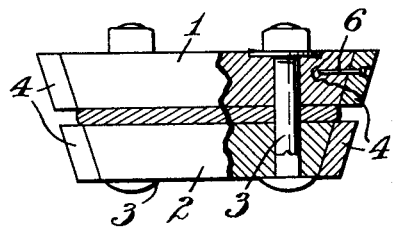
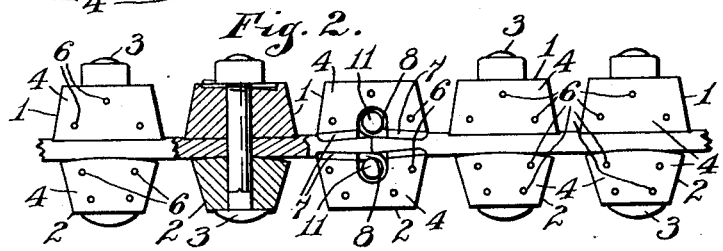
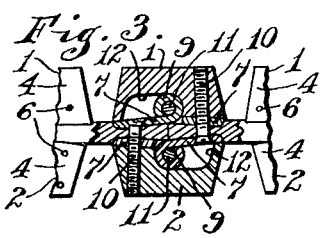
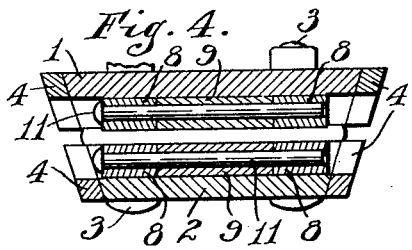
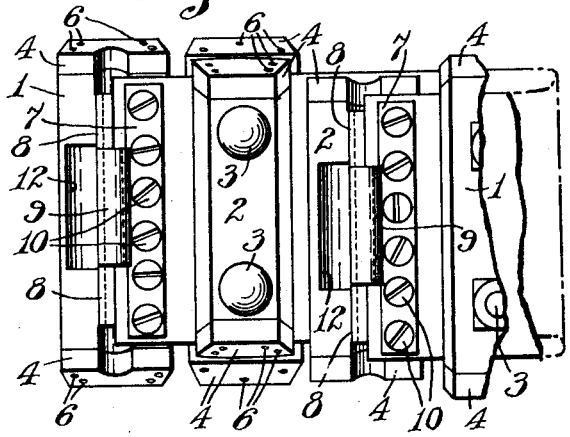
INVENTOR
Paul B. Reeves,
BY
Hood + Hahn
ATTORNEYS Patented May 22, 1928.

1,671,048

UNITED STATES PATENT OFFICE.

PAUL B. REEVES, OF COLUMBUS, INDIANA, ASSIGNOR TO REEVES PULLEY COMPANY, OF COLUMBUS, INDIANA, A CORPORATION OF INDIANA.

BELT FASTENER.

Application filed August 12, 1927. Serial No. 212,415.

My invention relates to improvements in driving belts and particularly belts adapted for use in connection with the type of transmission which for a long period has been commercially known as the "Reeves" transmission.

It is one of the objects of my invention to provide means for connecting the free ends of the belt to form a continuous band, which means will not interfere with the formation of the cross bars attached to the belt and which will give a secure connection that will not interfere with the flexibility of the belt.

For the purpose of disclosing my invention I have illustrated one embodiment thereof in the accompanying drawings in which—

Fig. 1 is a plan view of a belt embodying my invention;

Fig. 2 is a side elevation thereof, one of the blocks being shown in section;

Fig. 3 is a sectional view disclosing the connection means;

Fig. 4 is a sectional view taken in the opposite direction;

Fig. 5 is a sectional view showing the means for securing the blocks in position on the belt, and Fig. 6 is a plan view showing the ends of the belt disconnected.

In the embodiment of the invention illustrated the belt comprises a flexible band which is preferably formed of fabric and to which, at regular intervals, are secured wedge shaped cross bars. In the structure illustrated the cross bars are formed in two sections, the top section 1 and the bottom section 2 between which the belt is clamped, clamping screws or bolts 3 passing through the block sections for clamping them to the belt and securing them in position. The cross bars, at their ends, are inclined downwardly and inwardly and are provided with leather friction faces 4 which, when the blocks are formed of wood, may be secured by counter-sunk nails 6.

Each of the ends of the belt is provided with an interlocking means to coincide with the other end for joining the ends of the belt together. One end of the belt is provided on its under face with a plate 7 turned back at its opposite ends to form eyes 8. The upper side of this end is provided with a similar plate which, at its center is turned back to form an eye 9. These two plates are preferably clamped upon the end of the belt, being held in their clamped position by screws 10 which pass through the clamping plate and into the bottom block section. The opposite end of the belt is provided with similar plates secured in a similar manner. The plates on this end, however, being oppositely disposed so that when the ends are brought together the eyes 8 and 9 will be interdigitated and can be hingedly locked together by means of pins 11 passing through the interdigitated eyes. Both the upper and lower block sections are provided with recesses or grooves 12 in which the eyes of the connector members are adapted to lie so that when the ends of the belt are brought together the two sections of the block at the free ends will assume the same relationship with respect to one another and the belt, as the remaining blocks on the belt. It will be noted that the upper and lower sections of the blocks at the free ends are connected respectively to the opposite ends of the belt.

I claim as my invention:

1. A driving belt comprising a flexible band and a series of transversely extending friction blocks secured thereto and connecting means for the ends of the belt comprising top and bottom plates on each end having interdigitated eyes, pins passing through the interdigitated eyes, and a block section secured on each end and recessed on its under face to accommodate the interdigitated eyes.

2. A driving belt comprising a flexible band and a series of transversely extending friction blocks secured thereto, means for connecting the free ends of the band comprising top and bottom plates secured to each of the free ends of the band and having interdigitated eyes, pins passing through the eyes to lock the ends of the band together and upper and lower friction block sections, one secured to each end of the band and adapted to over-lie the opposite end and each having a recess in its under face to accommodate the interdigitated eyes.

In witness whereof, I, PAUL B. REEVES, have hereunto set my hand at Columbus, Indiana, this 3rd day of August, A. D. one thousand nine hundred and twenty seven.

PAUL B. REEVES.